June 25, 1940. S. F. ARBUCKLE ET AL 2,205,642
LAMP
Original Filed July 25, 1935
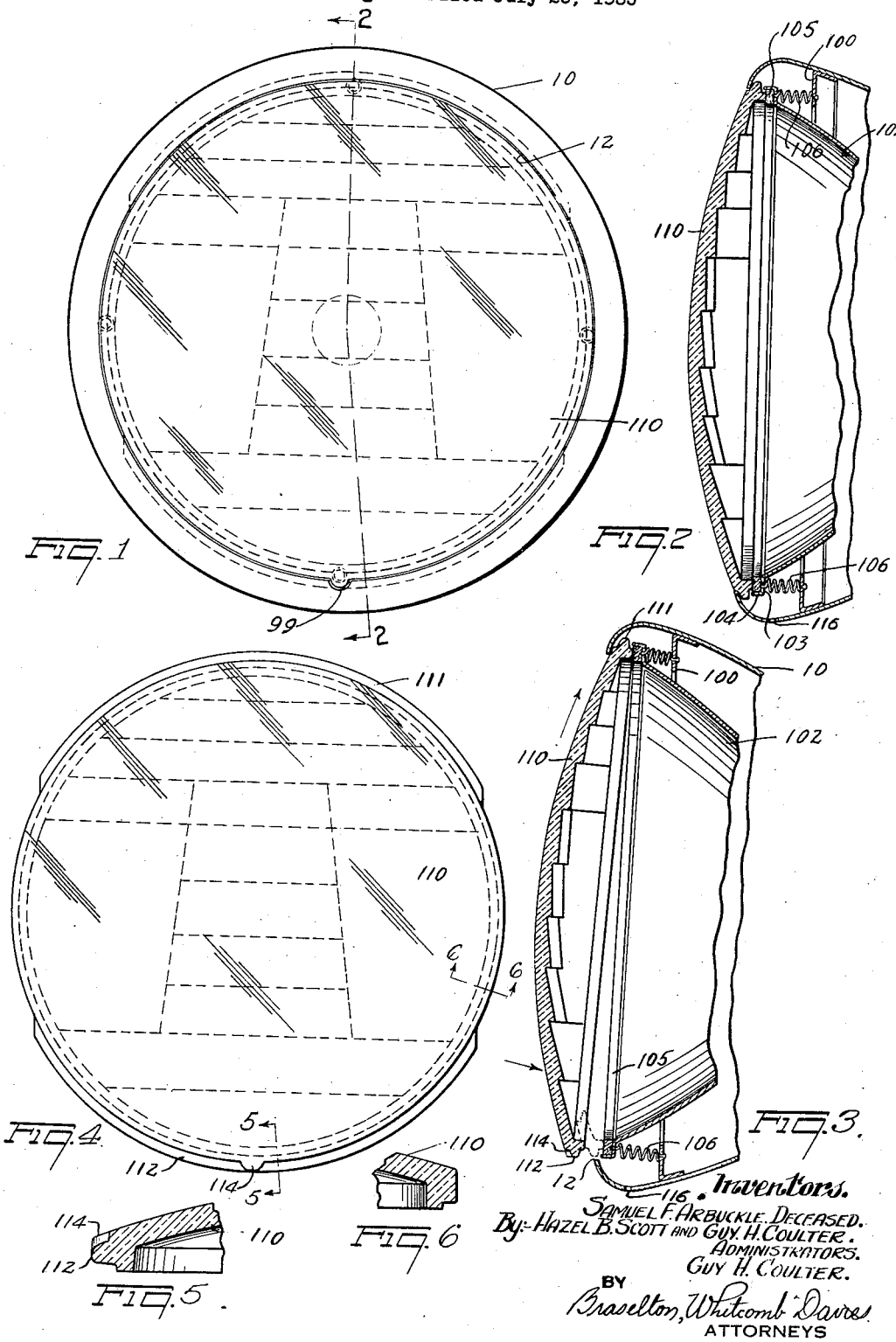

Patented June 25, 1940

2,205,642

UNITED STATES PATENT OFFICE 2,205,642

LAMP

Samuel F. Arbuckle, deceased, late of Detroit, Mich., by Hazel B. Scott, administratrix, Detroit, Mich., and Guy H. Coulter, administrator, Detroit, Mich., and Guy H. Coulter, Detroit, Mich., assignors to United Lens Corporation, Detroit, Mich.

Original application July 25, 1935, Serial No. 33,121. Divided and this application December 30, 1938, Serial No. 248,458

7 Claims. (Cl. 240—41.5)

This invention, a division of copending application, Serial No. 33,121, filed July 25, 1935, now Patent No. 21,152,834 of April 4, 1939, relates to improvements in lamps and particularly to an improved arrangement of headlamp construction for automotive vehicles.

The invention relates to an arrangement of lamp casing and lens construction wherein the opening of the lamp casing is entirely closed solely by the lens.

The invention embraces the formation of a headlamp casing of an integral construction and a particular lens arrangement which is of simple construction and readily assembled with the headlamp casing to provide a substantially closed arrangement wherein the lens forms the sole cover for the opening of the casing.

A further object of the invention is the provision of a headlamp construction wherein the lens is of particular configuration to be assembled within and retained as a front cover for headlamp casing of integral construction and wherein a seal is resiliently effected for the reflector.

A further object of the invention is the provision of a lamp of this character wherein the lens is formed with retaining means so that assembly and disassembly may be made without the use of special tools.

Still a further object of the invention is the provision of a lens of a character for completely enclosing the forward portion of a lamp casing and which is integrally formed with retaining means of a character which will properly locate the lens with respect to the lamp casing.

Another object is the provision of a headlamp construction wherein the lens forms the sole cover for the opening in the lamp casing whereby rims and special tools and retaining devices have been entirely eliminated and the assembly of the lamp greatly facilitated and simplified.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a front elevational view of a form of the invention wherein the lens is retained within the headlamp casing by means of particular lens configuration;

Figure 2 is a fragmentary vertical sectional view taken substantially on the line 2—2 of Figure 1;

Figure 3 is a view showing the method of assembling the lens and associated parts of the headlamp;

Figure 4 is a front elevational view of a lens illustrated in Figure 3;

Figure 5 is an enlarged fragmentary sectional view taken substantially on the line 5—5 of Figure 4;

Figure 6 is an enlarged fragmentary sectional view taken substantially on the line 6—6 of Figure 4.

Though the invention has been illustrated as incorporated for use in vehicle headlamp constructions, it is to be understood that its use is contemplated in all types of lamps or light projecting apparatus and wherever the same may be found to have utility.

Referring to the drawing and particularly Figures 1 to 3 thereof, the structure illustrated as incorporating a form of the invention is shown as a headlamp or light projecting apparatus suitable for use on automotive vehicles, and includes an outer casing or housing 10. The casing 10 is formed at its open end with an inturned flange 12 preferably provided with a notch or recess 99. The flange or rim 12 serves to support a lens or light emitting closure 110, providing in the embodiment illustrated the sole means to enclose the open end of the casing 10.

Adjacent the open end of the casing is fixedly secured to the inner surface of the shell or housing 10 a ring-like member 100 forming an opening to receive a reflector 102. Reflector 102 is provided with a flange portion 103 which terminates in an annular portion 104, the flange 103 serving to position a sealing gasket 105. Between the ring member 100 and the flange 103 in assembled relation are positioned a plurality of resilient members or springs 106 preferably of the expansive type. The springs 106 serve to resiliently mount the reflector 102 and also hold the reflector in spaced relation with respect to the ring 100.

To enclose the open end of the casing 10, the lens 110 is provided which is illustrated as having a smooth convex exterior surface and a concave interior surface formed with horizontal prismatic zones, but it is to be understood that other types of lenses having different prism arrangement may be used. The lens 110 is of a contour closely fitting the inner edge of the shell rim 12 and is preferably formed with peripheral projections or extensions 111 and 112 on the upper and lower edges respectively which underlie the inner surface or edge of the rim 12. At the lower front edge of lens 110 is formed a locating projection 114 engageable with the recess 99 in the casing when the lens is positioned therein.

To install lens 110 within the casing, the projection 111 is preferably inserted within the casing so that the front surface of the lens engages the open end or inturned rim 12 of the casing, to permit the projection 112 to be swung inwardly against the tension of the lowermost spring 106 and at the same time clear the lower edge of the casing. The lens is then moved downwardly until projection 114 engages the recess 99, at which time the peripheral projections 111 and 112 are in engagement with the surface of the inturned flange of the open end of the casing. Springs 106 exert sufficient force upon the reflector flange 103 and the lens to securely and positively hold the lens in position. To remove the lens from the casing, the upper part of the lens is moved rearwardly and then upwardly against the tension of spring 106 to permit the lower portion of the lens and projection 112 to be swung outwardly. The lens is then moved downwardly until projection 111 is free from the upper edge of the casing. The gasket 105 seals the space between the lens and the reflector when the several elements are in assembled relation. However, due to construction of the lens which permits its withdrawal and installation within the casing, a slight clearance is necessary and a certain amount of moisture may collect between the casing and the exterior of the reflector. If desired, an opening 116 may be provided in the lower portion of the casing to permit moisture which may collect within the casing to drain therefrom.

It is apparent that, within the scope of the invention, modifications and different arrangements may be made other than is herein disclosed, and the present disclosure is illustrative merely, the invention comprehending all variations thereof.

What is claimed is:

1. In a vehicle lamp, the combination of a casing having an inturned circular flange at its front, a reflector insertable within said casing, a resilient yieldable mounting for said reflector within said casing, a lens having diametrically opposite segments of a diameter corresponding to the diameter of the inner edge of said circular flange, and transversely arranged segments of greater diameter for seating on the inner face of said flange whereby said lens may be obliquely inserted within said casing without distortion thereof and by the displacement of said reflector, and whereby the resilient pressure of the mounting of said reflector will press the same against said lens and the latter in contact with its seat.

2. A lamp comprising a shell having a rim, a circular lens closely fitting the edge of said rim and having a pair of flanges underlying diametrically opposed segments of said rim but clearing the inner edge of transverse segments thereof whereby said lens may be inserted in the casing without flexing the rim, light projecting means within said shell, sealing means between said light projecting means and said lens, and spring means within the shell urging said lens outwardly through said rim and also urging said flanges against said rim.

3. In a vehicle lamp, the combination of a casing having an inturned continuous flange at its front; a reflector within said casing; a resilient mounting for said reflector carried by said casing; a lens having a contour corresponding to the inner edge of said flange and being formed with a locating extension and a pair of opposed projections underlying said flange for seating on the inner face of said flange whereby said lens may be obliquely inserted within said casing without distortion thereof by the displacement of said reflector, and when the lens is placed in normal position within said casing the resilient pressure of the mounting of said reflector will urge the lens locating extension and the pair of projections in seating contact with the inner face of said flange; and means carried by said reflector to form a seal between said lens and reflector.

4. A lamp comprising a shell having a rim; a lens closely fitting the edge of said rim and having a plurality of flanges underlying diametrically opposed sections of said rim but clearing the inner edge of the remaining section thereof whereby said lens may be inserted in the casing without flexing the rim; light projecting means within said shell; sealing means between said light projecting means and said lens; a ring shaped support carried by the inner surface of said shell spaced from said rim, said support having an inwardly directed flange; and spring means within the shell carried by the flange of said support having one end contacting with said light projecting means for urging said lens outwardly through said rim and also urging said flanges against the inner face of said rim.

5. A lamp comprising a shell having a rim, a lens closely fitting the edge of said rim and having a pair of flanges underlying diametrically opposed segments of said rim but clearing the inner edge of the remaining section thereof whereby said lens may be inserted in the shell without flexing the rim; resilient means within the shell urging said lens outwardly through said rim and also urging said flanges against said rim; and lens locating means formed on said rim for retaining said lens in proper position in said shell.

6. A lamp comprising a shell having an opening bounded by an inturned flange; a lens having its major contour corresponding to the shape of the opening formed by said flange and provided with extensions underlying diametrically opposed sections of said flange whereby said lens may be obliquely inserted in the shell without flexure thereof; a plurality of resilient elements within the shell urging said lens outwardly through said flange and also urging said lens extensions in contact with said flange; and means formed on said lens coacting with said flange for properly locating said lens in said shell.

7. A lamp comprising a shell having an opening bounded by an inturned flange; a lens having its major contour corresponding to the shape of the opening formed by said flange and provided with extensions underlying diametrically opposed sections of said flange whereby said lens may be obliquely inserted in the shell without flexure of said flange; resilient means within the shell urging said lens outwardly through said flange and also urging said lens extensions in contact with said flange; and a projection formed on said lens coacting with a notch formed on said flange for properly locating said lens in said shell.

HAZEL B. SCOTT,
*Administratrix of the Estate of Samuel F. Arbuckle, Deceased.*

GUY H. COULTER,
*Administrator of the Estate of Samuel F. Arbuckle, Deceased.*

GUY H. COULTER.

CERTIFICATE OF CORRECTION.

Patent No. 2,205,642. June 25, 1940.

SAMUEL F. ARBUCKLE, deceased, HAZEL B. SCOTT, administratrix,
and GUY H. COULTER, administrator; et al.

It is hereby certified that error appears in the printed specification of the above numbered patent requiring correction as follows: Page 1, first column, line 3, for "21,152,834" read --2,152,834--; and that the said Letters Patent should be read with this correction therein that the same may conform to the record of the case in the Patent Office.

Signed and sealed this 5th day of November, A. D. 1940.

(Seal)

Henry Van Arsdale,
Acting Commissioner of Patents.